US008837348B2

(12) United States Patent
Wang et al.

(10) Patent No.: US 8,837,348 B2
(45) Date of Patent: Sep. 16, 2014

(54) RELAY TRANSMISSION METHOD AND DEVICE

(75) Inventors: Jing Wang, Beijing (CN); Guangyi Liu, Beijing (CN); Xiaodong Shen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 338 days.

(21) Appl. No.: 13/387,031

(22) PCT Filed: Jul. 14, 2010

(86) PCT No.: PCT/CN2010/075138
§ 371 (c)(1),
(2), (4) Date: Mar. 16, 2012

(87) PCT Pub. No.: WO2011/012048
PCT Pub. Date: Feb. 3, 2011

(65) Prior Publication Data
US 2012/0163285 A1     Jun. 28, 2012

(30) Foreign Application Priority Data
Jul. 27, 2009  (CN) .......................... 2009 1 0089881

(51) Int. Cl.
*H04J 3/08*      (2006.01)
*H04B 7/155*      (2006.01)
*H04W 72/04*      (2009.01)
*H04B 7/26*      (2006.01)
*H04W 84/04*      (2009.01)

(52) U.S. Cl.
CPC ......... *H04W 72/0493* (2013.01); *H04B 7/2606* (2013.01); *H04B 7/15542* (2013.01); *H04W 84/047* (2013.01); *H04B 7/15592* (2013.01)
USPC ............ 370/315; 370/310; 370/329; 370/328

(58) Field of Classification Search
CPC ........... H04J 13/18; H04J 13/12; H04J 11/00; H04W 24/00; H04W 84/18; H04W 84/12; H04W 88/04; H04W 88/08; H04W 72/04; H04W 76/00; H04W 72/0446; H04W 72/0453; H04W 36/18; H04W 36/0011; H04W 36/30; H04W 36/24; H04W 52/40; H04I 5/0007; H04I 27/206; H04I 27/265; H04I 43/50; H04I 43/0852; H04I 41/12; H04I 45/02; H04I 12/66
USPC ........ 370/203, 209, 210, 252, 254, 310, 315, 370/329, 330, 331, 332, 333, 338, 401; 709/220; 375/260, 132; 455/444, 436
See application file for complete search history.

(56) References Cited

U.S. PATENT DOCUMENTS 6,597,671 B1 *   7/2003   Ahmadi et al. ................ 370/329
7,796,552 B2 *   9/2010   Julian et al. .................... 370/331
(Continued)

FOREIGN PATENT DOCUMENTS

| CN | 101124846 A | 2/2008 |
| CN | 101272305 A | 9/2008 |
| WO | 2009/018515 | 2/2009 |

*Primary Examiner* — Abdullah Riyami
(74) *Attorney, Agent, or Firm* — Workman Nydegger

(57) ABSTRACT

A relay transmission method, cell base station and relay station, for improving the average spectrum efficiency and throughput of a cell, are provided by the present invention. Said relay transmission method includes that when data transmission is performed between Access Points APs and each user, AP identification set groups which consist of the AP identification sets without intersection, are determined from the AP identification sets corresponding to the users, wherein the AP identification set comprises AP identifications of the APs which can provide services for the user; according to the determined AP identification set groups, same resources are allocated to the users corresponding to the AP identification sets in the same AP identification set group, and different resources are allocated to the users corresponding to the AP identification sets in the different AP identification set groups; and each AP in the AP identification set corresponding to each user is informed to provide services for the user by using the resources allocated to the user.

10 Claims, 7 Drawing Sheets

(56) References Cited

U.S. PATENT DOCUMENTS

| | | | |
|---|---|---|---|
| 2007/0076671 A1* | 4/2007 | Winget et al. | 370/338 |
| 2007/0258427 A1* | 11/2007 | Shaheen et al. | 370/338 |
| 2008/0013553 A1* | 1/2008 | Shaheen | 370/401 |
| 2008/0049672 A1* | 2/2008 | Barak et al. | 370/330 |
| 2008/0080364 A1* | 4/2008 | Barak et al. | 370/210 |
| 2008/0090575 A1* | 4/2008 | Barak et al. | 455/444 |
| 2009/0094351 A1* | 4/2009 | Gupta et al. | 709/220 |
| 2009/0129341 A1* | 5/2009 | Balasubramanian et al. | 370/331 |
| 2009/0279500 A1* | 11/2009 | Luo et al. | 370/330 |
| 2009/0310554 A1* | 12/2009 | Sun et al. | 370/329 |
| 2010/0008258 A1* | 1/2010 | Ji et al. | 370/254 |
| 2010/0034149 A1* | 2/2010 | Lederer et al. | 370/329 |
| 2010/0034163 A1* | 2/2010 | Damnjanovic et al. | 370/329 |
| 2010/0118817 A1* | 5/2010 | Damnjanovic et al. | 370/329 |
| 2010/0197309 A1* | 8/2010 | Fang et al. | 455/436 |
| 2010/0323700 A1* | 12/2010 | Bachmann et al. | 455/436 |
| 2011/0019529 A1* | 1/2011 | Wang et al. | 370/209 |
| 2011/0199927 A1* | 8/2011 | Frost et al. | 370/252 |
| 2013/0150046 A1* | 6/2013 | Gogic et al. | 455/436 |

* cited by examiner

RELAY TRANSMISSION METHOD AND DEVICE

The present application is a US National Stage of International Application No. PCT/CN2010/075138, filed 14 Jul. 2010, designating the United States, and claiming priority to Chinese Patent Application No. 200910089881.8 filed 27 Jul. 2009. Both of the aforementioned applications are incorporated herein in their entireties by this reference.

FIELD OF THE INVENTION

The present invention relates to the field of communications and particularly to a relay transmission method, an eNodeB and a route node.

BACKGROUND OF THE INVENTION

The relay technology intended to improve a link capacity and increase a cell coverage area is one of core technologies for a Long Term Evolution-Advanced (LTE-Advanced) system. Radio signals are transported between a Route Node (RN), an eNodeB (eNB) and a User Equipment (UE) to extend effectively a coverage area of the eNB. FIG. 1 illustrates an implementation environment thereof, where the route node amplifies and forwards the received radio signals to compensate for a propagation loss of the radio signals, in order to improve the power of the radio signal received by the eNB and/or the UE and improve the capacity of a relay link.

An effective method of improving the capacity of a relay link is the technology of cooperative diversity between the eNB and the RN as illustrated in FIG. 2 or between a plurality of RNs as illustrated in FIG. 3 dependent upon different radio environments. Of course, the technology of cooperative diversity can be implemented in a variety of technical solutions and the following description will be presented by taking the downlink as an example.

1. Mutual coordination is performed between the eNB and the RN or between the RNs through distributed space-time coding, and a transmission diversity gain is obtained at the UE side; or the UE may listen to and acquire transmission signals of the eNB and the RN(s) respectively and acquire a temporal diversity gain through maximum ratio combining.

2. A diversity gain and a coding gain are acquired between the eNB and the RN or between the RNs through coordinated coding.

Another effective method of improving the capacity of a relay link is to multiplex resources so that the eNB may be configured with a plurality of RNs dependent upon the demand and actual deployment of a system. In view of limited transmission power of the RNs, resource multiplexing may be used for the different RNs sufficiently far away from each other to improve the average spectrum efficiency and throughput of a cellular cell and further improve the capacity of the relay link, as illustrated in FIG. 4.

However, in the prior art, resource multiplexing and cooperative diversity pose sharply different requirements on a radio link: in a system, co-channel interference shall be as little as possible for the solution of resource multiplexing, that is, propagation losses of resource-multiplexed RNs or eNBs to the same UE shall differ as significantly as possible; and signal-to-noise ratios of cooperative RNs or eNBs shall be as approximate as possible for the solution of cooperative diversity, that is, propagation losses of the RNs or eNBs of cooperative diversity to the same UE shall differ as little as possible.

The existing LTE-Advanced system purely relies upon cooperative diversity or resource multiplexing to provide an access service. In the system for which cooperative diversity is adopted alone, balanced signal-to-noise ratios of cooperative links are required for cooperative diversity, and this is dependent upon the position of the UE, so there is a limited scope of applications; and an improvement to the average spectrum efficiency and throughput of a cell is limited due to a radio resource loss caused by relay forwarding. In the system for which resource multiplexing is adopted alone, the RNs have to be deployed according to a sophisticated rule but may be constrained to some extent under a practical deployment condition, so it may be difficult to fully multiple resources between the RNs.

SUMMARY OF THE INVENTION

An embodiment of the invention provides a relay transmission method to improve the average spectrum efficiency and throughput of a cell, which includes:

for transmission of a data frame between Access Points, APs, and UEs, determining groups of sets of AP identifiers composed of disjoint sets of AP identifiers among sets of AP identifiers corresponding to the UEs, wherein a set of AP identifiers includes AP identifiers of APs capable of serving a UE;

allocating the same resource to UEs corresponding to sets of AP identifiers in the same group of sets of AP identifiers and different resources to UEs corresponding to sets of AP identifiers in different groups of sets of AP identifiers according to the determined groups of sets of AP identifiers; and instructing the APs in the set of AP identifiers corresponding to the UE to serve the UE by using the resource allocated to the UE.

An embodiment of the invention further provides a relay transmission method to improve the average spectrum efficiency and throughput of a cell, which includes:

for transmission of a data frame between Access Points, APs, and UEs, when one or more sets of AP identifiers corresponding to one or more of the UEs each include only one AP identifier which is an identifier of a route node, each of the route nodes allocating a resource to its corresponding UE and serving the UE by using the allocated resource, wherein a set of AP identifiers includes AP identifiers of APs capable of serving one UE;

an eNodeB determining groups of sets of AP identifiers composed of disjoint sets of AP identifiers among sets of AP identifiers corresponding to UEs to which no resource is allocated; allocating the same resource to UEs corresponding to sets of AP identifiers in the same group of sets of AP identifiers and different resources to UEs corresponding to sets of AP identifiers in different groups of sets of AP identifiers according to the determined groups of sets of AP identifiers; and instructing APs in the set of AP identifiers corresponding to the UE to serve the UE by using the resource allocated to the UE.

An embodiment of the invention provides an eNodeB to improve the average spectrum efficiency and throughput of a cell, which includes:

an acquisition module configured to acquire sets of Access Point, AP, identifiers each including AP identifiers of APs capable of serving a UE;

a first determination module configured to determine groups of sets of AP identifiers composed of disjoint sets of AP identifiers among the sets of AP identifiers acquired by the acquisition module;

an allocation module configured to allocate resources to UEs with ongoing transmission of a data frame by allocating the same resource to UEs corresponding to sets of AP identifiers in the same group of sets of AP identifiers and different resources to UEs corresponding to sets of AP identifiers in different groups of sets of AP identifiers according to the determined groups of sets of AP identifiers; and an instruction module configured to instruct APs in a set of AP identifiers corresponding to a UE to serve the UE by using the resource allocated to the UE.

An embodiment of the invention provides a route node to improve the average spectrum efficiency and throughput of a cell, which includes a reception module, a first determination module, a second determination module, a transmission module, an allocation module and a service module, wherein:

the reception module is configured to receive a set of Access Point, AP, identifiers including AP identifiers of APs capable of serving a UE;

the first determination module is configured to determine whether the set of AP identifiers includes only an identifier of the route node, and if so, trigger the second determination module; otherwise, trigger the transmission module;

the second determination module is configured to determine whether the route node is capable of allocating a resource, and if so, trigger the allocation module; otherwise, trigger the transmission module;

the transmission module is configured to transmit the received set of AP identifiers to an eNodeB and transmit a resource request message to the eNodeB when the route node is not capable of allocating any resource;

the allocation module is configured to allocate a resource to the UE corresponding to the set of AP identifiers; and the service module is configured to serve the UE by using the resource allocated by the allocation module to the UE.

Advantageous effects of the invention are as follows:

in the embodiments of the invention, for transmission of a data frame between Access Points (APs) and UEs, an eNodeB determines groups of sets of AP identifiers composed of disjoint sets of AP identifiers among sets of AP identifiers corresponding to the UEs, allocates resources to the UEs according to the determined groups of sets of AP identifiers by allocating the same resource to UEs corresponding to sets of AP identifiers in the same group of sets of AP identifiers and different resources to UEs corresponding to sets of AP identifiers in different groups of sets of AP identifiers, and instructs APs in a set of AP identifiers corresponding to a UE to serve the UE by using the resource allocated to the UE, thereby improving the efficiency of multiplexing the resources. The scenario in which a route node can schedule a resource by itself is also taken into account, so the resources can be utilized more fully and flexibly over the prior art without purely depending upon any initial setting of a system, thereby alleviating a constrain of a deployment condition of the system to the RN and also lowering loss of the radio resources caused by relay forwarding and facilitating an improvement to the average spectrum efficiency and throughout of a cell. A positional change of a UE can be taken into account to thereby extend a scope of applications.

DETAILED DESCRIPTION OF THE EMBODIMENTS

Figure 1:
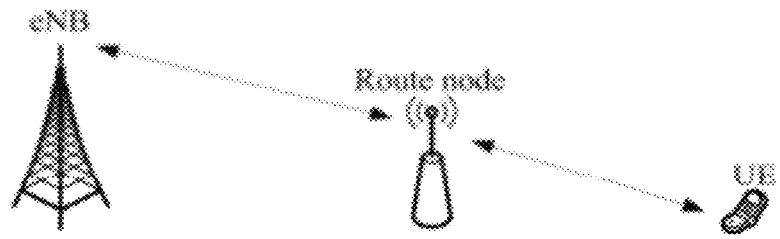
FIG. 1 is a schematic diagram of transporting a radio signal in a cell through a route node in the prior art.
Figure 2:
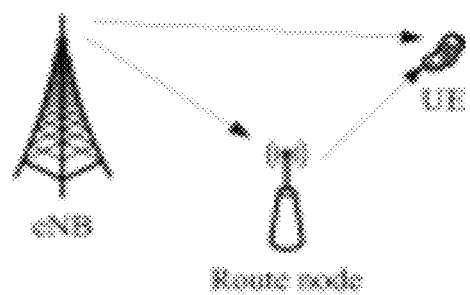
FIG. 2 and FIG. 3 are schematic diagrams of cooperative diversity in a cell in the prior art.
Figure 3:
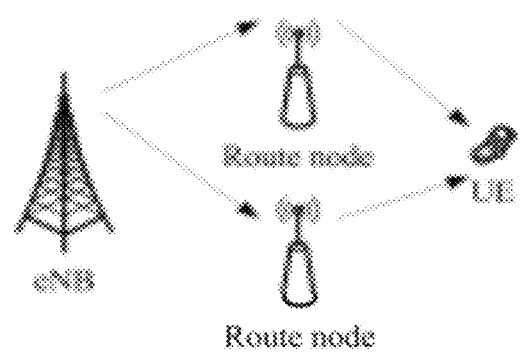
Figure 4:
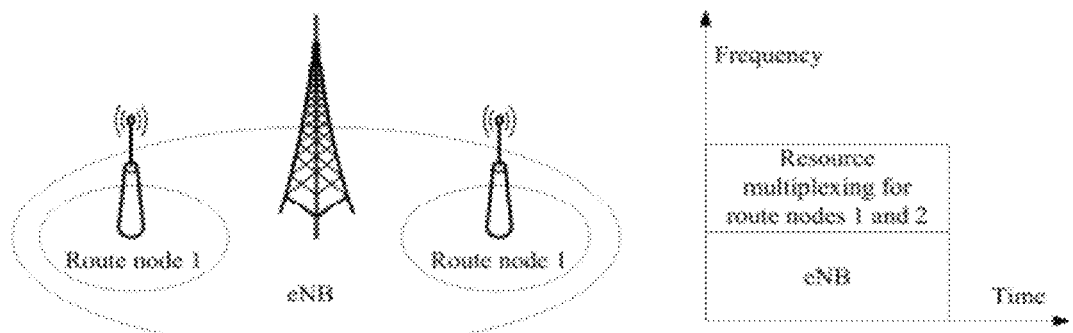
FIG. 4 is a schematic diagram of resource multiplexing in a cell in the prior art.
Figure 5:
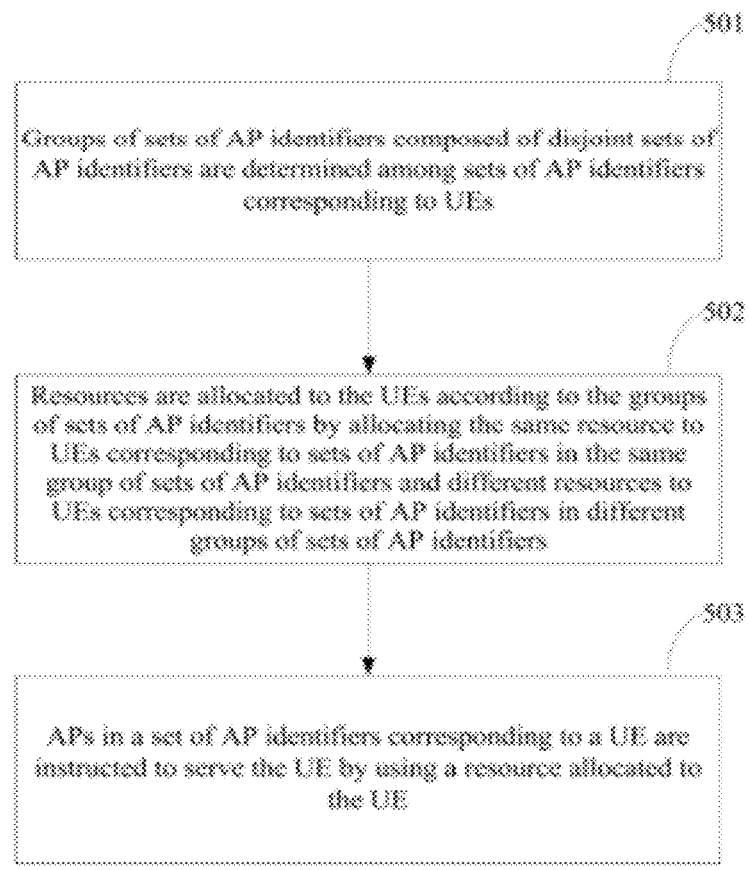
FIG. 5 is a flow chart of a relay transmission method according to an embodiment of the invention.

In order to improve the average spectrum efficiency and throughput of a cell, an embodiment of the invention provides a relay transmission method applicable to transmission of a data frame between Access Points (APs) and UEs for optimizing allocation of resources, where the APs include an eNB and route nodes, and FIG. 5 illustrates a flow thereof.

In a step 501, groups of sets of AP identifiers composed of disjoint sets of AP identifiers are determined among sets of AP identifiers corresponding to UEs, where one set of AP identifiers includes AP identifiers of APs capable of serving one UE.

In a step 502, resources are allocated to the UEs according to the groups of sets of AP identifiers by allocating the same resource to UEs corresponding to sets of AP identifiers in the same group of sets of AP identifiers and different resources to UEs corresponding to sets of AP identifiers in different groups of sets of AP identifiers.

In a step 503, APs in a set of AP identifiers corresponding to a UE are instructed to serve the UE by using a resource allocated to the UE.

In the flow as illustrated in FIG. 5, the resources may be allocated and scheduled centrally by the eNB in the system, that is, the steps illustrated in FIG. 5 may be performed by the eNB. The sets of AP identifiers corresponding to the UEs are determined before the step 501 is performed, and in an implementation, the sets of AP identifiers may be determined in numerous ways, for example, a UE may select APs in a cell. In an implementation, the UE may determine the APs capable of serving the UE according to qualities of links between APs in the cell and the UE, generate the corresponding set of AP identifiers according to the AP identifiers of the determined APs and transmit the corresponding set of AP identifiers to the determined APs.

In an implementation, a quality of a link may be measured in numerous ways, for example, the UE may measure a value of a link quality parameter of the link between an AP in the cell and the UE, compare the value of the link quality parameter of the link and a preset threshold of the link quality parameter and select an AP corresponding to a link with a value of the link quality parameter larger than the threshold of the link quality parameter.

The UE transmits the determined set of AP identifiers to the determined AP, the APs receive the set of AP identifiers, and if the set of AP identifiers includes identifiers of a plurality of route nodes but does not include an identifier of the eNB, the route nodes receiving the set of AP identifiers transmit the set of AP identifiers to the eNB.

Typically, the UE measures the qualities of the links between the APs and the UE according to a downlink Common Reference Signal (CRS). A link quality parameter may include any one of Reference Signal Received Power (RSRP), Signal-to-Interference and Noise Ratio (SINR), Carrier-to-Interference and Noise Ratio (CINR) and a link capacity. Of course, another parameter may be selected as a measurement criterion for the quality of a link so long as the quality of a link can be reflected by the selected parameter. In an implementation, the threshold of the link quality parameter may vary dynamically from one service to another.

In an implementation, for a Time Division Duplex (TDD) system, the quality of a link may be measured at the AP side due to reciprocity of the uplink and the downlink in a measurement process similar to that at the UE side.

A description will be presented now by way of an example assuming a cell including an eNB, an RN1, an RN2 and a UE A.

The UE A measures RSRPs from the eNB, the RN1 and the RN2, compares measurement results thereof with a threshold of the signal quality parameter, determines that the values of the signal quality parameter of the RN1 and the RN2 are larger than the threshold of the signal quality parameter, composes a set of AP identifiers from the identifiers of the RN1 and the RN2 and transmits the set of AP identifiers to the RN1 and the RN2; and the RN1 and the RN2 receive the set of AP identifiers, determine that the set of AP identifiers includes the two RN identifiers but does not include the identifier of the eNB and transmit the set of AP identifiers to the eNB.

The set of AP identifiers may alternatively be determined in another embodiment: the eNB determines APs capable of serving a UE according to the qualities of links between APs in the cell and the UE and generates a set of AP identifiers corresponding to the UE from the AP identifiers of the determined APs. In this embodiment, an implementation is as follows.

The UE measures the values of a link quality parameter of links between APs in the cell and the UE and feeds the values of the link quality parameter back to the eNB, and the eNB compares the values of the link quality parameter with a preset threshold of the link quality parameter, selects APs corresponding to the links with a value of the link quality parameter larger than the threshold of the link quality parameter and generates a set of AP identifiers corresponding to the UE from the AP identifiers of the determined APs.

In the step 502, the groups of sets of AP identifiers may be determined in numerous ways, for example, the groups of sets of AP identifiers composed of disjoint sets of AP identifiers may be determined without further determining whether the groups of sets of AP identifiers intersect, in which case more resources will subsequently be allocated to a UE corresponding to more than two groups of sets of AP identifiers, and this is suitable for a UE with a larger amount of traffic. Alternatively, a group of sets of AP identifiers including the largest number of disjoint sets of AP identifiers may be determined among unselected sets of AP identifiers, and the sets of AP identifiers in the group of sets of AP identifiers may be identified as "Selected"; and this step may be repeated until all of the sets of AP identifiers are identified as "Selected", in which case a resource will be allocated to the UE only once, and no resource will be wasted for a UE with a smaller amount of traffic. Of course, the groups of sets of AP identifiers may be otherwise determined in an implementation under a specific condition.

Figure 6:
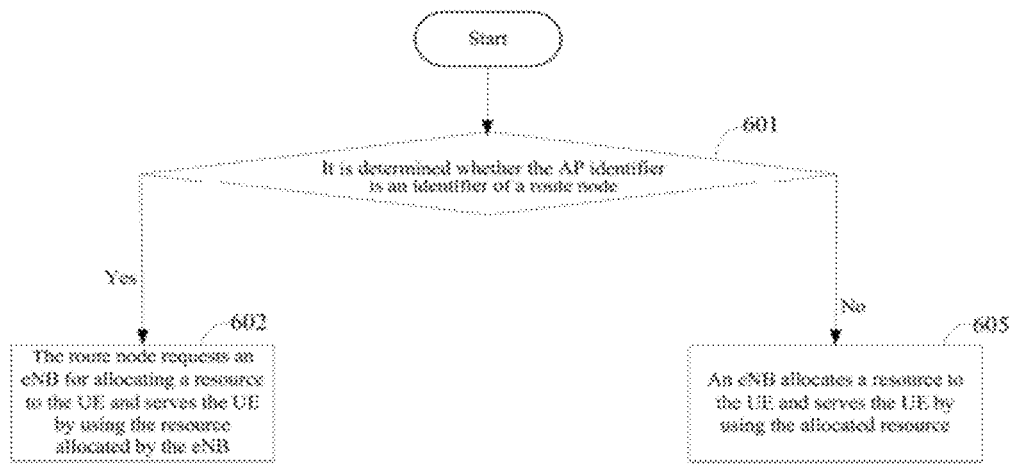
FIG. 6 is a flow chart for a set of AP identifiers including one AP identifier according to an embodiment of the invention.

If a set of AP identifiers corresponding to a UE includes one AP identifier, an AP corresponding to the AP identifier serves the UE by using the resource allocated to the UE, and FIG. 6 illustrates processing steps thereof.

In a step 601, it is determined whether the AP identifier is an identifier of a route node, and if so, the process goes to a step 602; otherwise, the process goes to a step 603.

In the step 602, the route node requests an eNB for allocating a resource to the UE and serves the UE by using the resource allocated by the eNB.

In the step 603, an eNB allocates a resource to the UE and serves the UE by using the allocated resource.

Of course, a set of AP identifiers corresponding to a UE may alternatively include a plurality of AP identifiers, and all of APs corresponding to the AP identifiers in the set of AP identifiers may serve the UE or a part of the APs corresponding to the AP identifiers in the set of AP identifiers may serve the UE, and the part of the APs may be selected in numerous ways, for example, APs with a lower utilization ratio of schedulable resources may be determined to provide the UE with an access service, or one or more of the APs may be determined randomly to provide the UE with an access service, or APs may be determined according to the positional information of the APs or like information. The APs with a lower utilization ratio of schedulable resources may be selected for a higher utilization ratio of resources.

Figure 7:
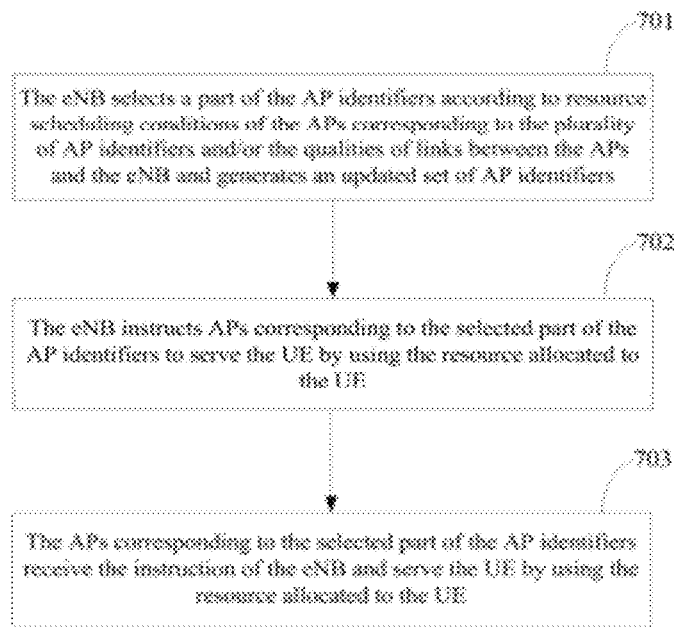
FIG. 7 is a flow chart of determining a set of serving AP identifiers according to an embodiment of the invention.

After the step 502 is performed in this example, a set of AP identifiers may include a plurality of AP identifiers, so the eNB may select APs for serving the UE according to resource scheduling conditions of the APs corresponding to the plurality of AP identifiers and/or the qualities of links between the APs and the UE in order to optimize a service for the UE, and FIG. 7 illustrates processing steps thereof.

In a step 701, the eNB selects a part of the AP identifiers according to resource scheduling conditions of the APs corresponding to the plurality of AP identifiers and/or the qualities of links between the APs and the UE and generates an updated set of AP identifiers.

In a step 702, the eNB instructs APs corresponding to the selected part of the AP identifiers to serve the UE by using the resource allocated to the UE.

In a step 703, the APs corresponding to the selected part of the AP identifiers receive the instruction of the eNB and serve the UE by using the resource allocated to the UE.

The updated set of AP identifiers may include one or more AP identifiers under a practical condition. When the updated set of AP identifiers includes a plurality of AP identifiers, the eNB instructs the APs to serve the UE through cooperative diversity in order to improve the average spectrum efficiency and throughput of the cell; and the APs receive the instruction of the eNB and serve the UE through cooperative diversity.

In an implementation, cooperative diversity may be performed in numerous diversity modes, e.g., temporal diversity, frequency diversity, spatial diversity, and coding diversity, under a practical condition.

Figure 8:
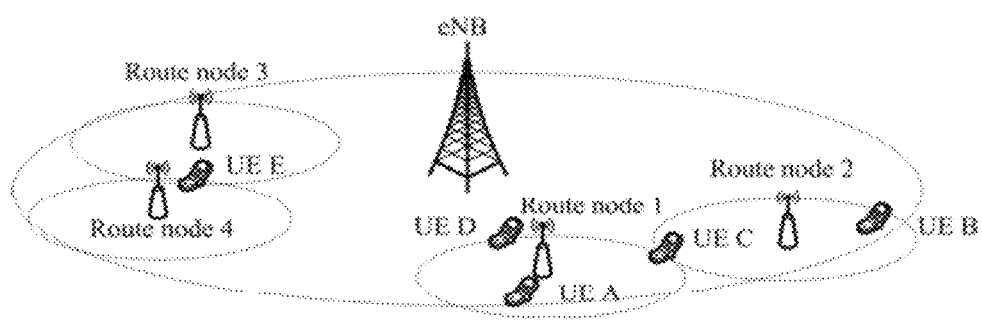
FIG. 8 is a schematic diagram of a radio environment according to an embodiment of the invention.

A description will be presented now in an example with a cell including an eNB, an RN1, an RN2, an RN3 and an RN4 and a UE A, a UE B, a UE C, a UE D and a UE E as illustrated in FIG. 8, where the eNB performs centralized management and scheduling of resources, and a processing flow is as follows.

The UE A, the UE B, the UE C, the UE D and the UE E measure RSRPs respectively from the eNB, the RN1, the RN2, the RN3 and the RN4, and the UEs feed measurement results to the eNB, possibly directly or through the route nodes.

The eNB compares the RSRP measurement results of the UE A for the APs and determines that the RN1 can serve the UE A, that is, a set of AP identifiers corresponding to the UE A includes only the identifier of the RN1, because the RSRP value of the RN1 is larger than an RSRP threshold of the UE A; and alike the eNB determines that a set of AP identifiers corresponding to the UE B includes only the identifier of the RN2, a set of AP identifiers corresponding to the UE C includes the identifiers of the RN1 and the RN2, a set of AP identifiers corresponding to the UE D includes the identifiers of the eNB and the RN1 and a set of AP identifiers corresponding to the UE E includes the identifiers of the RN3 and the RN4. Table 1 depicts the following correspondence relationship for the sake of clarity.

TABLE 1

|      | RN1 | RN2 | RN3 | RN4 | eNB |
|------|-----|-----|-----|-----|-----|
| UE A | ✓   |     |     |     |     |
| UE B |     | ✓   |     |     |     |
| UE C | ✓   | ✓   |     |     |     |
| UE D | ✓   |     |     |     | ✓   |
| UE E |     |     | ✓   | ✓   |     |

The eNB determines groups of sets of AP identifiers composed of disjoint sets of AP identifiers among the determined sets of AP identifiers, and in an implementation, the determined groups of sets of AP identifiers may include numerous combinations of sets of AP identifiers, one of which will be described now as an example.

Figure 9:
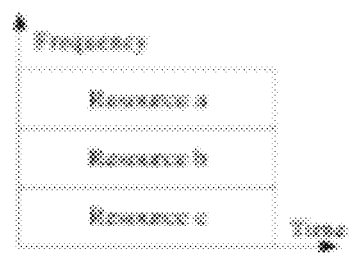
FIG. 9 is a schematic diagram of resource allocation according to an embodiment of the invention.

In this example, the sets of AP identifiers corresponding to the UE A, the UE B and the UE E may compose a group of sets of AP identifiers, the sets of AP identifiers corresponding to the UE B and the UE D may also compose a group of sets of AP identifiers, and the sets of AP identifiers corresponding to the UE C and the UE E may also compose a group of sets of AP identifiers. Resource multiplexing efficiency comparison shows that the resource multiplexing efficiency for the UE A, the UE B and the UE E is highest, so the eNB allocates the same resource "a" to the UE A, the UE B and the UE E; the set of AP identifiers corresponding to the UE C intersects with the sets of AP identifiers corresponding to the UE A and the UE B, so the eNB allocates a resource "b" other than the resource "a" to the UE C; and the set of AP identifiers corresponding to the UE D intersects with the sets of AP identifiers corresponding to the UE A and the UE C, so the eNB allocates a resource "c" other than the resources "a" and "b" to the UE D. FIG. 9 illustrates the allocation of the resources.

The eNB determines that the UE D is served by only the eNB but not the RN1 according to a resource scheduling condition and/or the quality of the link between the UE and the RN, and an updated set of AP identifiers of the UE D includes only the identifier of the eNB while the sets of AP identifiers of the other UEs are not changed. Table 2 depicts a resource allocation scheme resulting from the foregoing steps.

TABLE 2

|      | RN1 | RN2 | RN3 | RN4 | eNB | Allocated resource |
|------|-----|-----|-----|-----|-----|--------------------|
| UE A | ✓   |     |     |     |     | a                  |
| UE B |     | ✓   |     |     |     | a                  |
| UE E |     |     | ✓   | ✓   |     | a                  |
| UE C | ✓   | ✓   |     |     |     | b                  |
| UE D |     |     |     |     | ✓   | c                  |

After the resources are allocated, the set of AP identifiers of the UE C includes the identifiers of the RN1 and the RN2, and the set of AP identifiers of the UE E includes the identifiers of the RN3 and the RN4, so the eNB instructs the RN1 and the RN2 to provide the UE C with a cooperative diversity service over the resource "b" and the RN3 and the RN4 to provide the UE E with a cooperative diversity service over the resource "a"; and for the UE with its corresponding set of AP identifiers including only one AP identifier, the eNB simply instructs the AP corresponding to the AP identifier to serve the UE by using the allocated resource.

Of course, in an implementation, the groups of sets of AP identifiers may be determined in numerous ways, and such a scenario may arise that more resources may be required for a UE with a larger amount of traffic and corresponding to two groups of sets of AP identifiers. Following the foregoing example, possible allocation of the resources includes the resource "a" allocated to the UE A, the UE B and the UE E and the resource "c" allocated to the UE B and the UE D, and then the resource "a" and the resource "c" are occupied for the UE B.

Figure 10:
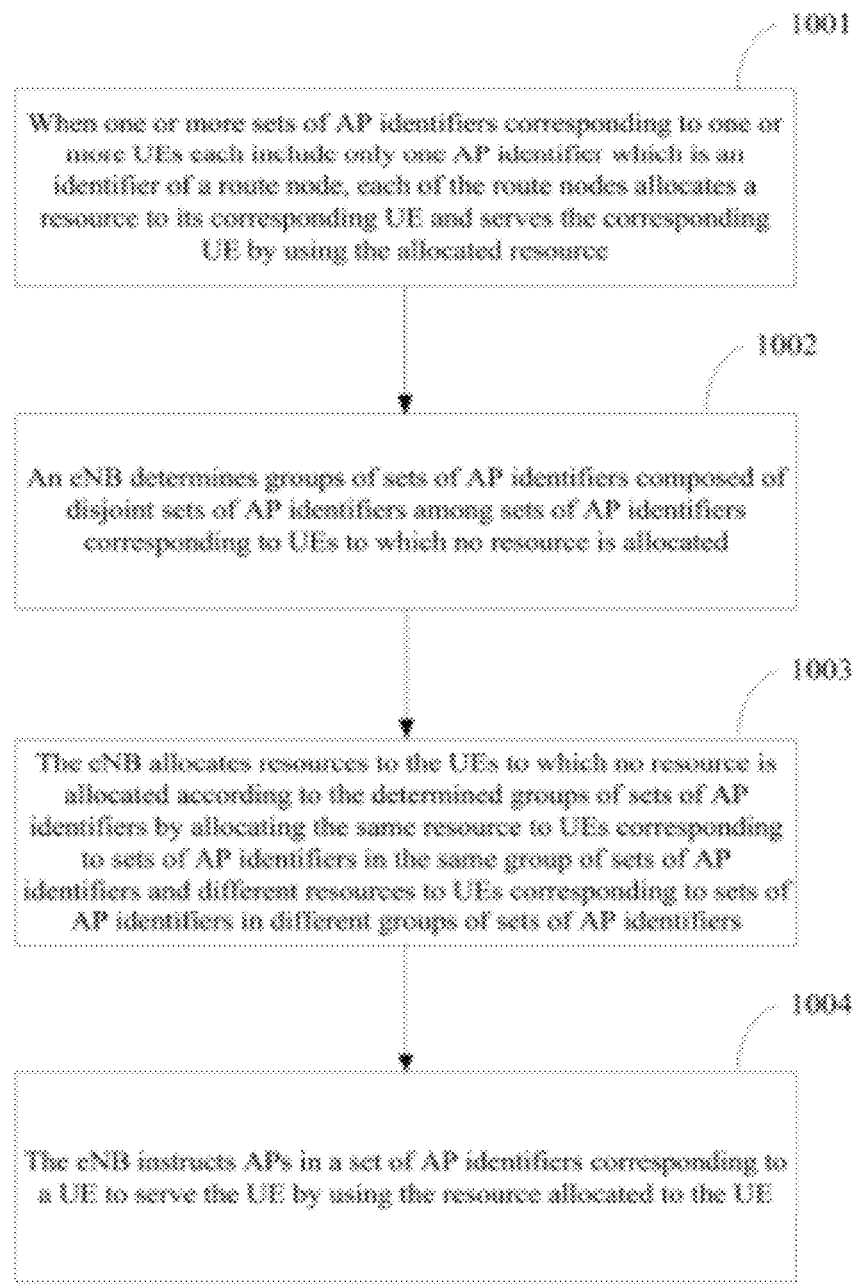
FIG. 10 is a flow chart of another relay transmission method according to an embodiment of the invention.

In an implementation, a part of resources may be allocated to an RN in addition to the eNB for scheduling, in order to improve the average spectrum efficiency and throughput of the cell, an embodiment of the invention further provides a relay transmission method applicable to transmission of a data frame between APs and UEs for optimizing allocation of resources, and FIG. 10 illustrates a flow thereof.

In a step 1001, when one or more sets of AP identifiers corresponding to one or more UEs each include only one AP identifier which is an identifier of a route node, each of the route nodes allocates a resource to its corresponding UE and serves the corresponding UE by using the allocated resource.

In a step 1002, an eNB determines groups of sets of AP identifiers composed of disjoint sets of AP identifiers among sets of AP identifiers corresponding to UEs to which no resource is allocated.

In a step 1003, the eNB allocates resources to the UEs to which no resource is allocated according to the determined groups of sets of AP identifiers by allocating the same resource to UEs corresponding to sets of AP identifiers in the same group of sets of AP identifiers and different resources to UEs corresponding to sets of AP identifiers in different groups of sets of AP identifiers.

In a step 1004, the eNB instructs APs in a set of AP identifiers corresponding to a UE to serve the UE by using the resource allocated to the UE.

Figure 11:
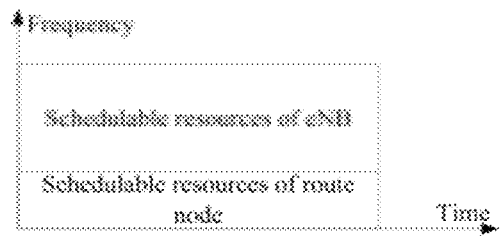
FIG. 11 and FIG. 12 are schematic diagrams of resource allocation according to an embodiment of the invention.

In the step 1001, such a scenario may also arise in an implementation that an RN allocates directly a resource for providing a UE with an access service, as illustrated in FIG. 11, and for the sake of a convenient description, the system illustrated in FIG. 8 will now be taken as an example, where the same determined sets of AP identifiers corresponding to the UEs will also be applied, and reference can be made to Table 1 for details thereof.

The set of AP identifiers corresponding to the UE A includes only the identifier of the RN1, and the set of AP identifiers corresponding to the UE B includes only the identifier of the RN2; and the RN1 and the RN2 determine that they are capable of allocating a resource to the UEs upon reception of the sets of AP identifiers transmitted from the UE A and the UE B and allocate a resource respectively to the UE A and the UE B among schedulable resources of the RNs, that is, the same resource is multiplexed for the UE A and the UE B.

For the UE C, the UE D and the UE E, the eNB determines groups of sets of AP identifiers composed of disjoint sets of AP identifiers among the sets of AP identifiers corresponding to the three UEs, that is, the sets of AP identifiers corresponding to the UE D and the UE E compose a group of sets of AP identifiers, and the set of AP identifiers corresponding to the UE C is a group of sets of AP identifiers.

Figure 12:
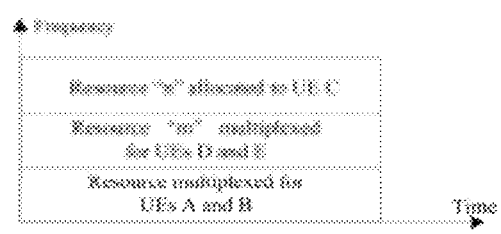

Therefore, the eNB allocates the same resource "m" to the UE D and the UE E among schedulable resources of the eNB and a resource "n" other than the resource "m" to the UE C, and FIG. 12 illustrates the allocation of the resources.

The eNB determines that the UE D is served by only the eNB but not the RN1 according to a resource scheduling condition and/or the quality of the link between the UE and the RN, and an updated set of AP identifiers of the UE D includes only the identifier of the eNB while updated sets of AP identifiers of the UE C and the UE E are the same as their original sets of AP identifiers.

After the resources are allocated, the set of AP identifiers of the UE C includes the identifiers of the RN1 and the RN2, and the set of AP identifiers of the UE E includes the identifiers of the RN3 and the RN4, so the eNB instructs the RN1 and the RN2 to provide the UE C with a cooperative diversity service over the resource "n" and the RN3 and the RN4 to provide the UE E with a cooperative diversity service over the resource "m".

Figure 13:
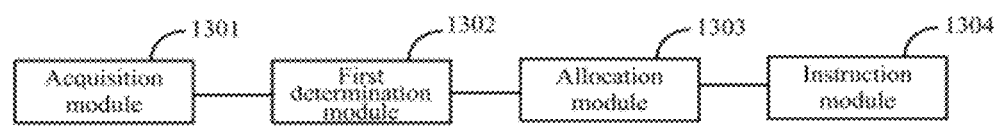
FIG. 13, FIG. 14 and FIG. 15 are schematic structural diagrams of an eNodeB according to an embodiment of the invention.

Based upon the same inventive idea, an embodiment of the invention provides an eNodeB, and FIG. 13 illustrates a structure thereof including:

an acquisition module 1301 configured to acquire sets of Access Point (AP) identifiers each including AP identifiers of APs capable of serving a UE;

a first determination module 1302 configured to determine groups of sets of AP identifiers composed of disjoint sets of AP identifiers among the sets of AP identifiers acquired by the acquisition module;

an allocation module 1303 configured to allocate resources to UEs with ongoing transmission of a data frame by allocating the same resource to UEs corresponding to sets of AP identifiers in the same group of sets of AP identifiers and different resources to UEs corresponding to sets of AP identifiers in different groups of sets of AP identifiers according to the groups of sets of AP identifiers; and an instruction module 1304 configured to instruct APs in a set of AP identifiers corresponding to a UE to serve the UE by using the resource allocated to the UE.

Figure 14:
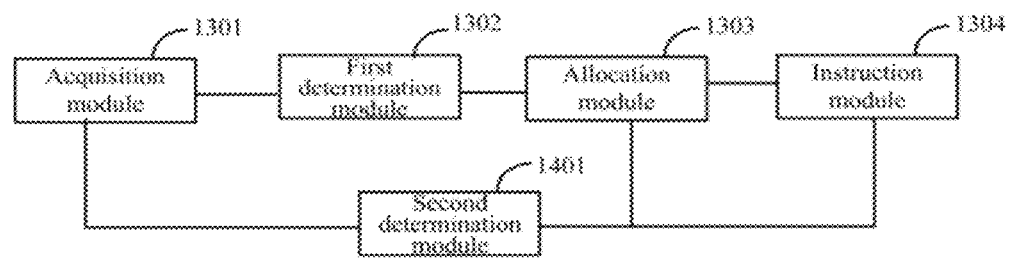

In an embodiment, the eNodeB as illustrated in FIG. 14 may further include:

a second determination module 1401 configured to, when a set of AP identifiers includes a plurality of AP identifiers, select a part of the AP identifiers according to resource scheduling conditions of APs corresponding to the plurality of AP identifiers and/or the qualities of links between the APs and the UE, generate an updated set of AP identifiers and then trigger the instruction module 1304.

In an embodiment, the second determination module 1401 may be further configured to trigger the instruction module 1304 upon determining that the updated set of AP identifiers includes a plurality of AP identifiers; and the instruction module 1304 may be further configured to instruct the plurality of APs to serve the UE through cooperative diversity.

Figure 15:
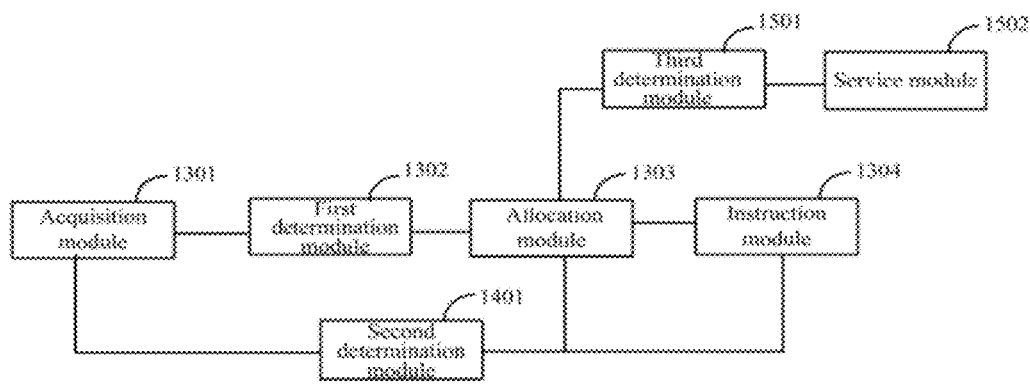

In an embodiment, the eNodeB as illustrated in FIG. 15 may further include a third determination module 1501 and a service module 1502.

The third determination module 1501 is configured to trigger the service module 1502 upon determining that the updated set of AP identifiers includes an identifier of the eNodeB.

The service module 1502 is configured to serve the UE by using the resource allocated by the allocation module 1303 to the UE.

The third determination module 1501 is further configured to trigger the service module 1502 upon determining that the set of serving AP identifiers further includes an identifier of at least one route node; and the service module 1502 is further configured to serve the UE through cooperative diversity.

Figure 16:
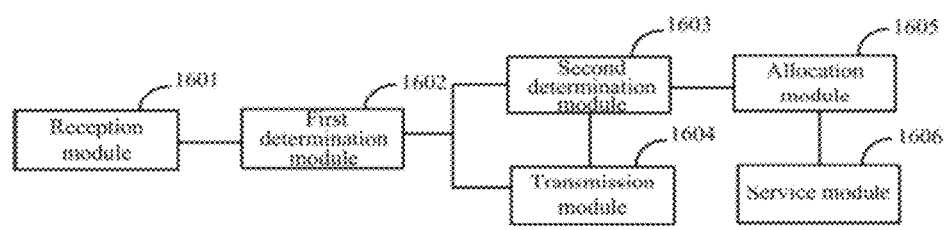
FIG. 16 is a schematic structural diagram of a route node according to an embodiment of the invention.

Based upon the same inventive idea, an embodiment of the invention further provides a route node, and FIG. 16 illustrates a structure thereof including a reception module 1601, a first determination module 1602, a second determination module 1603, a transmission module 1604, an allocation module 1605 and a service module 1606.

The reception module 1601 is configured to receive a set of Access Point (AP) identifiers including AP identifiers of APs capable of serving a UE.

The first determination module 1602 is configured to determine whether the set of AP identifiers includes only the identifier of the route node, and if so, trigger the second determination module 1603; otherwise, trigger the transmission module 1604.

The second determination module 1603 is configured to determine whether the route node is capable of allocating a resource, and if so, trigger the allocation module 1605; otherwise, trigger the transmission module 1604.

The transmission module 1604 is configured to transmit the received set of AP identifiers to an eNodeB and transmit a resource request message to the eNodeB when the route node is not capable of allocating any resource.

The allocation module 1605 is configured to allocate a resource to the UE corresponding to the set of AP identifiers.

The service module 1606 is configured to serve the UE by using the resource allocated by the allocation module 1605 to the UE.

In an embodiment, the reception module 1601 may be further configured to receive an instruction transmitted from the eNodeB that the resource has been allocated to the UE; and the service module 1606 may be further configured to serve the UE by using the resource allocated by the eNodeB to the UE.

In an embodiment, the reception module 1601 may be further configured to receive an instruction transmitted from the eNodeB to perform cooperative diversity; and the service module 1606 may be further configured to serve the UE through cooperative diversity.

In the embodiments of the invention, for transmission of a data frame between Access Points (APs) and UEs, an eNodeB determines groups of sets of AP identifiers composed of disjoint sets of AP identifiers among sets of AP identifiers corresponding to the UEs, allocates resources to the UEs according to the groups of sets of AP identifiers by allocating the same resource to UEs corresponding to sets of AP identifiers in the same group of sets of AP identifiers and different resources to UEs corresponding to sets of AP identifiers in different groups of sets of AP identifiers, and instructs APs in a set of AP identifiers corresponding to a UE to serve the UE by using the resource allocated to the UE, thereby improving the efficiency of multiplexing the resources. The scenario in which a route node can schedule a resource by itself is also taken into account, so the resources can be utilized more fully and flexibly over the prior art without purely depending upon any initial setting of a system, thereby alleviating a constrain of a deployment condition of the system to the RN and also lowering loss of the radio resources caused by relay forwarding and facilitating an improvement to the average spectrum efficiency and throughout of a cell. A positional change of a UE can be taken into account to thereby extend a scope of applications.

Furthermore, when a set of serving AP identifiers includes a plurality of AP identifiers, the APs corresponding to the AP identifiers serve a UE through cooperative diversity to thereby improve the average spectrum efficiency and throughout of a cell.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A relay transmission method, comprising:
   for transmission of a data frame between Access Points, APs, and UEs, determining groups of sets of AP identifiers composed of disjoint sets of AP identifiers among sets of AP identifiers corresponding to the UEs, wherein a set of AP identifiers comprises AP identifiers of APs capable of serving a UE;
   allocating the same resource to UEs corresponding to sets of AP identifiers in the same group of sets of AP identifiers and different resources to UEs corresponding to sets of AP identifiers in different groups of sets of AP identifiers according to the determined groups of sets of AP identifiers; and
   instructing the APs in the set of AP identifiers corresponding to the UE to serve the UE by using the resource allocated to the UE, wherein determining the groups of sets of AP identifiers composed of disjoint sets of AP identifiers among the sets of AP identifiers corresponding to the UEs comprises:
   determining a group of sets of AP identifiers comprising the largest number of disjoint sets of AP identifiers among unselected sets of AP identifiers, and identifying the sets of AP identifiers in the group of sets of AP identifiers as "Selected"; and
   repeating the foregoing step until all the sets of AP identifiers are identified as "Selected".

2. The method according to claim 1, wherein the sets of AP identifiers corresponding to the UEs are determined by:
   each of the UEs determining the APs capable of serving the UE according to qualities of links between APs in a cell and the UE, generating the corresponding set of AP identifiers from the AP identifiers of the determined APs, and transmitting the corresponding set of AP identifiers to the determined APs; or
   an eNodeB determining the APs capable of serving each of the UEs according to qualities of links between APs in a cell and the UE, and generating the set of AP identifiers corresponding to the UE from the AP identifiers of the determined APs.

3. The method according to claim 1, wherein if a set of AP identifiers comprises only one AP identifier, an AP corresponding to the AP identifier serves a UE corresponding to the set of AP identifiers by using the resource allocated to the UE.

4. The method according to claim 3, wherein if the one AP identifier is an identifier of a route node, the route node requests an eNodeB for allocating a resource to the UE and serves the UE by using the resource allocated by the eNodeB; or
   if the one AP identifier is an identifier of an eNodeB, the eNodeB allocates a resource to the UE and serves the UE by using the allocated resource.

5. The method according to claim 1, wherein if a set of AP identifiers corresponding to a UE comprises a plurality of AP identifiers, the method further comprises: an eNodeB selecting a part of the AP identifiers according to resource scheduling conditions of APs corresponding to the plurality of AP identifiers and/or qualities of links between the APs and the UE, and generating an updated set of AP identifiers;
   the eNodeB instructing APs corresponding to the part of the AP identifiers to serve the UE by using the resource allocated to the UE; and
   the APs corresponding to the part of the AP identifiers receiving the instruction of the eNodeB and serving the UE by using the resource allocated to the UE.

6. The method according to claim 5, wherein if the updated set of AP identifiers comprises a plurality of AP identifiers, the eNodeB instructs the plurality of APs to serve the UE through cooperative diversity; and
   the plurality of APs receiving the instruction of the eNodeB and serving the UE through cooperative diversity.

7. A relay transmission method, comprising:
   for transmission of a data frame between Access Points, APs, and UEs, when one or more sets of AP identifiers corresponding to one or more of the UEs each comprise only one AP identifier which is an identifier of a route node, each of the route nodes allocating a resource to its corresponding UE and serving the UE by using the allocated resource, wherein a set of AP identifiers comprises AP identifiers of APs capable of serving one UE;
   an eNodeB determining groups of sets of AP identifiers composed of disjoint sets of AP identifiers among sets of AP identifiers corresponding to UEs to which no resource is allocated; allocating the same resource to UEs corresponding to sets of AP identifiers in the same group of sets of AP identifiers and different resources to UEs corresponding to sets of AP identifiers in different groups of sets of AP identifiers according to the determined groups of sets of AP identifiers; and
   instructing APs in the set of AP identifiers corresponding to the UE to serve the UE by using the resource allocated to the UE, wherein determining the groups of sets of AP identifiers composed of disjoint sets of AP identifiers among the sets of AP identifiers corresponding to the UEs comprises:
   determining a group of sets of AP identifiers comprising the largest number of disjoint sets of AP identifiers among unselected sets of AP identifiers, and identifying the sets of AP identifiers in the group of sets of AP identifiers as "Selected"; and
   repeating the foregoing step until all the sets of AP identifiers are identified as "Selected".

8. The method according to claim 7, wherein the sets of AP identifiers corresponding to the UEs are determined by:
   each of the UEs determining the APs capable of serving the UE according to qualities of links between APs in a cell and the UE, generating the corresponding set of AP identifiers from the AP identifiers of the determined APs, and transmitting the corresponding set of AP identifiers to the determined APs; or an eNodeB determining the APs capable of serving each of the UEs according to qualities of links between APs in a cell and the UE, and generating the set of AP identifiers corresponding to the UE from the AP identifiers of the determined APs.

9. The method according to claim 7, wherein if a set of AP identifiers corresponding to a UE comprises a plurality of AP identifiers, the method further comprises: the eNodeB selecting a part of the AP identifiers according to resource scheduling conditions of APs corresponding to the plurality of AP identifiers and/or qualities of links between the APs and the UE, and generating an updated set of AP identifiers;

the eNodeB instructing APs corresponding to the part of the AP identifiers to serve the UE by using the resource allocated to the UE; and the APs corresponding to the part of the AP identifiers receiving the instruction of the eNodeB and serving the UE by using the resource allocated to the UE.

10. The method according to claim 9, wherein if the updated set of AP identifiers comprises a plurality of AP identifiers, the eNodeB instructs the plurality of APs to serve the UE through cooperative diversity; and the plurality of APs receiving the instruction of the eNodeB and serving the UE through cooperative diversity.

* * * * *